(12) United States Patent
Livesey

(10) Patent No.: US 7,259,766 B1
(45) Date of Patent: Aug. 21, 2007

(54) APERIODIC TILING OF TEXTURED IMAGES

(75) Inventor: Martin Livesey, San Francisco, CA (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/183,621

(22) Filed: Oct. 30, 1998

(51) Int. Cl.
*G09G 5/00* (2006.01)
(52) U.S. Cl. ...................... 345/582; 345/588
(58) Field of Classification Search ............... 345/419, 345/429, 430, 435, 427, 147, 432, 434, 582, 345/588; 358/456, 453
See application file for complete search history.

(56) References Cited

U.S. PATENT DOCUMENTS

| | | | | |
|---|---|---|---|---|
| 5,226,175 A | * | 7/1993 | Deutsch et al. | 345/419 |
| 5,235,435 A | * | 8/1993 | Schiller | 358/456 |
| 5,285,291 A | * | 2/1994 | Schiller | 358/453 |
| 5,305,118 A | * | 4/1994 | Schiller et al. | 358/456 |
| 5,575,125 A | * | 11/1996 | Lalvani | 52/311.2 |
| 5,748,192 A | * | 5/1998 | Lindholm | 345/425 |
| 5,775,040 A | * | 7/1998 | Lalvani | 52/311.2 |
| 5,956,043 A | * | 9/1999 | Jensen | 345/430 |
| 6,011,557 A | * | 1/2000 | Keskes et al. | 345/430 |

OTHER PUBLICATIONS

Glassner, Aperiodic Tiling, May/Jun. 1998, IEEE Computer Graphics and Applications, pp. 83-90.*

Glassner, Penrose Tiling, Jul./Aug. 1998, IEEE Computer Graphics and Applications, pp. 78-86.*

Stam, Jos, Aperiodic Texture Mapping, Jul. 1996-Mar. 1997, ERCIM European Research Consortium for Informatics and Mathematics, pp. 1-9.*

* cited by examiner

*Primary Examiner*—Sumati Lefkowitz
*Assistant Examiner*—Motilewa Good-Johnson
(74) *Attorney, Agent, or Firm*—Patterson & Sheridan LLP

(57) ABSTRACT

A method and system for performing textured mapping of a target area is provided. According to the method, input is received that defines a textured image. Tiles are generated from the textured image used to cover the target area in an aperiodic tiling pattern.

According to one aspect, the textured image is obtained by scanning one or more texture images into memory.

According to another aspect, to cover the target area an aperiodic tiling pattern is selected. Textured tiles based on the aperiodic tiling pattern are then generated and applied to the target area.

According to another aspect, to apply the textured aperiodic tiles to the target area, the target area is covered with one or more aperiodic tiles that are based on a selected aperiodic tiling pattern. A corresponding textured tile is then mapped to each of the one or more aperiodic tiles.

10 Claims, 12 Drawing Sheets
(3 of 12 Drawing Sheet(s) Filed in Color)

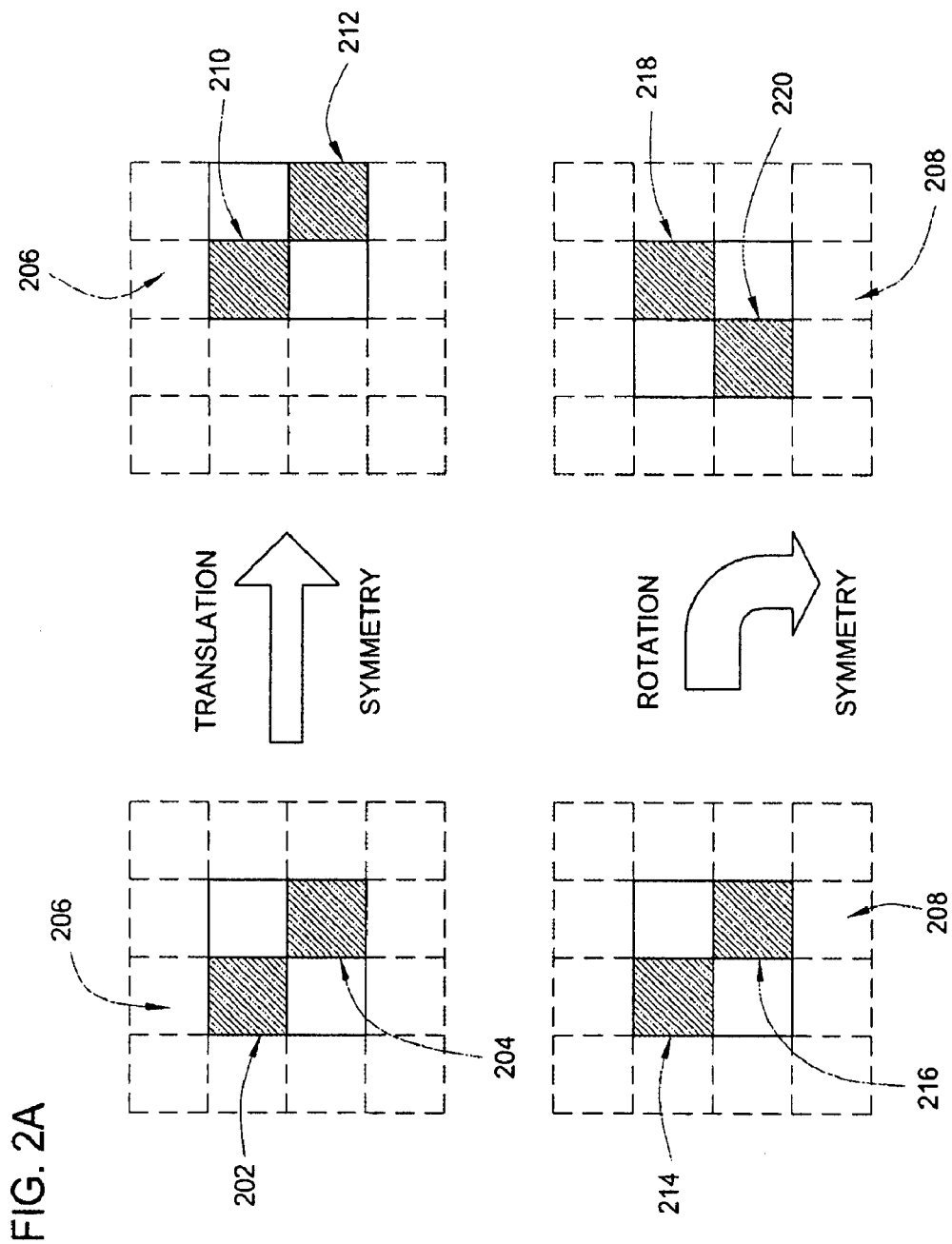

FIG. 4
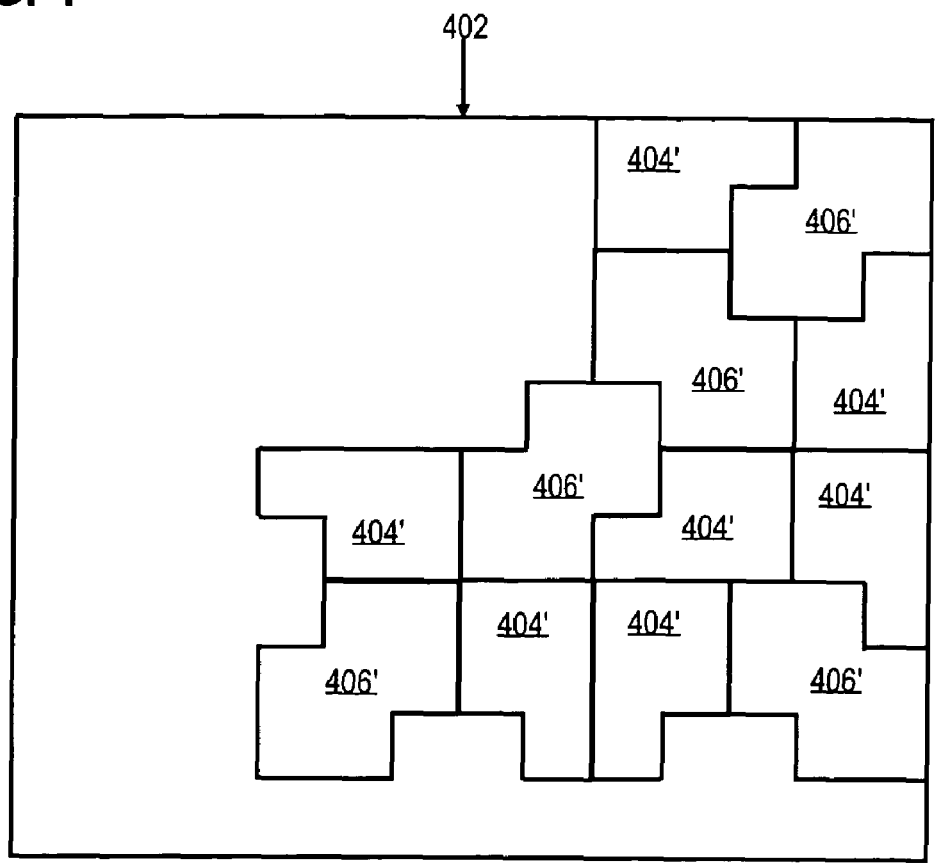
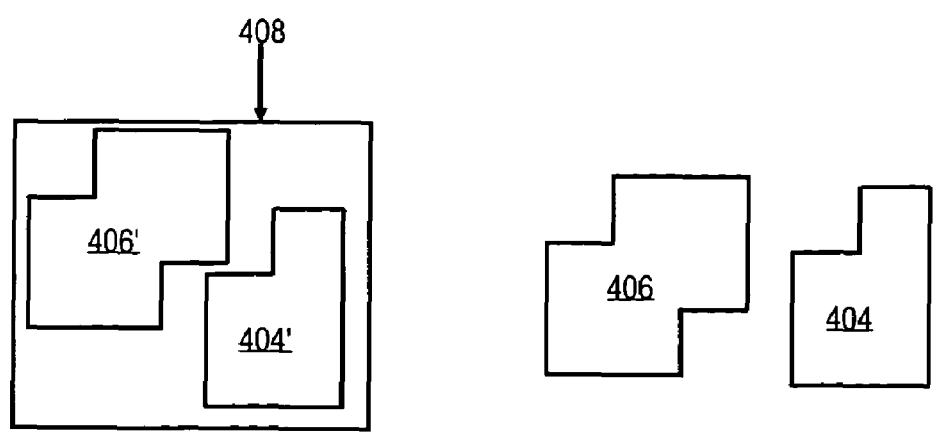

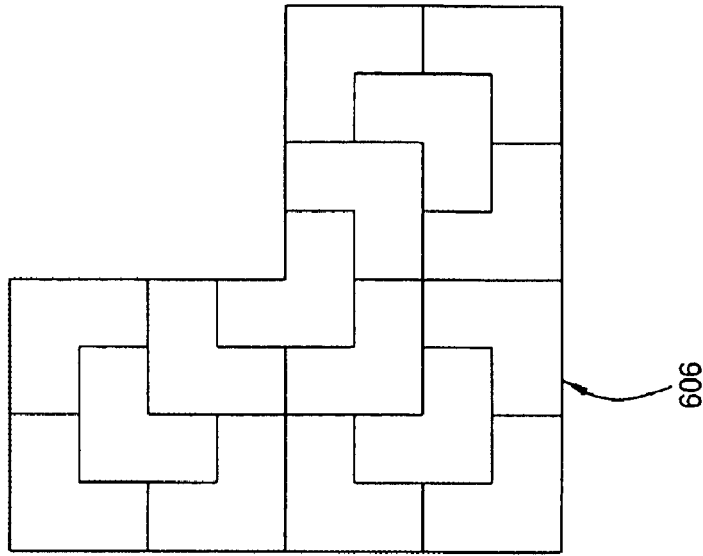
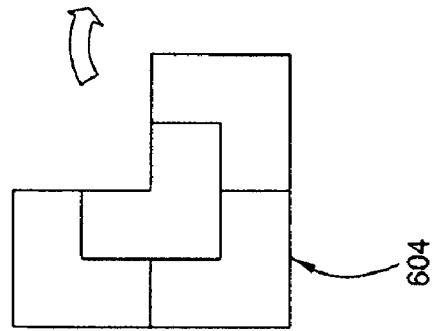
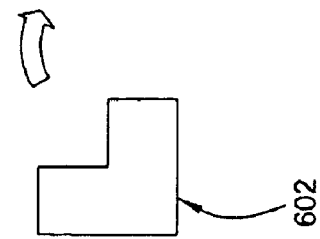
A COMPOSITION TILING
FIG. 6

APERIODIC TILING OF TEXTURED IMAGES

FIELD OF THE INVENTION

The present invention relates to graphical images and, more specifically, to a method for tiling textured images.

BACKGROUND OF THE INVENTION

The use of computer graphics has begun to play a large part in our every day lives and activities. For example, many movies feature scenes that contain objects and images that are generated through the use of computer graphics. Computer architecture programs allow users to graphically design buildings and plan landscaping layouts. Several television shows, cartoons and commercials depict animated characters and images through the use of computer graphics.

For many graphical applications, it is desirable for objects to be presented in as realistic a form as possible. One method of producing a realistic image of a particular object is by scanning a picture of the object into memory. Once the object image is scanned into memory, it can be manipulated and graphically displayed as required by the particular application.

For certain graphical applications, a large textured region, such as a section of ocean, a concrete wall, or large area of grass, is needed for a particular scene or setting. For example, a particular architectural design application may require that a large area of grass be displayed for a particular landscaping layout.

One method of applying texture to a region (the "target area") is through the use of a process known as texture mapping. Texture mapping is generally performed by acquiring a digital image that depicts the texture ("texture image") that is to be applied to the target area. The texture image may be acquired, for example, by scanning a photograph of something that has the desired texture. Alternatively, the textured image may be created using a computer aided drawing package, such as Microsoft® Paint, or generated as an artificial texture through the use of a computer. Once the texture image has been acquired, one or more "tiles" are generated based on the texture image. The process of creating tiles from a texture image is referred to herein as generating texture tiles. After the textured tiles have been generated, non-overlapping copies of the tiles are applied to the target area in a way that covers the target area.

The process of applying tiles to a particular area is generally referred to as "tiling". Tiling is performed by covering the target area, without gaps or overlaps, using a closed set of tiles. The pattern in which the tiles are applied is referred to herein as the tiling pattern. The peripheral shapes of the tiles dictate what type of tiling patterns are possible. For example, when rectangular tiles are used, the tiling pattern is typically a rectangular grid.

FIG. 1 illustrates a tile 102 depicting a grass texture that can be used to cover a particular surface for simulating an area of grass. In this example, a single rectangular tile 102 was generated from a texture image. FIG. 2B illustrates a target area 200 covered with copies of tile 102 in a grid-like tiling pattern. The grid-like tiling pattern used to cover target area 200 with copies of tile 102 is an example of the type of periodic tiling patterns used by conventional texture mapping methods.

Periodic tiling patterns are patterns that have both a translational symmetry and a rotational symmetry. Translational symmetry is an invariant isometry in a given direction through a given distance. Isometry is a mapping of the Euclidean plane onto itself which preserves all distances. Symmetry is defined as an isometry that maps any given set onto itself. Thus, if a target area is tiled using a periodic tiling pattern, by starting at a particular point within the target area and taking a finite area of radius "R" around the point, by moving another radius R away, the exact same texture can be found that is contain in the area around the point.

Rotational symmetry, on the other hand, is an invariant isometry about a given point (central rotation) through a given angle.

For example, in FIG. 2A, the tiling of target areas 206 and 208 are respectively performed using translation and rotation symmetry. In this example, tiles at locations 202 and 204 in target area 206 are symmetrically translated to the right to tiling locations 210 and 212, respectively. Conversely, tiles at locations 214 and 216 in target area 208 are symmetrically rotated clockwise for respectively tiling locations 218 and 220. Tiles at locations 202, 204, 210, 212, 214, 216, 218 and 220 have been shaded so that they may be more easily identified. The symmetries apply to the underlying grid expanded infinitely in both horizontal and vertical directions on the page. An infinite square grid translated parallel to one of the sides of a square, by the length of a square's side is identical to the original grid (i.e. a translational symmetry). The same infinite grid rotated a quarter turn clockwise about the corner of any square is identical to the original grid (i.e. rotational symmetry).

A drawback with using conventional texture mapping methods is that the translational symmetry of the tiling patterns cause certain displacements, called "periods", to be formed. These periods are like repeating puzzle pieces that form repeating sub-patterns that are easily detected over the target area.

For example, as is seen in FIG. 2B, applying tile 102 to target area 200 using a periodic tiling pattern causes a readily discernable rectangular sub-pattern to be produced. This sub-pattern is easily detected by the human eye, thus causing the texture of the target area 200 to appear as a linear repetition of the tiling pattern of tile 102. As a result, the "seams" between the tiles becomes noticeable, thus defeating the goal of creating a region that appears to have a relatively-uniform texture.

In an attempt to reduce the noticeability of seams, some texture mapping methods alternate between using the original tile, and modified images of the tile. The modified images are typically produced by rotating, translating and/or mirroring (i.e. flipping over) the original tile in order to tile the target area. However, because periodic symmetry is inherent in these methods, discernable sub-patterns are also evident on the target areas.

Based on the foregoing, it is highly desirable to provide a mechanism for tiling a target area with a texture image without creating discernable sub-patterns.

SUMMARY OF THE INVENTION

A method and system for performing textured mapping of a target area is provided. According to the method, input is received that defines a textured image. Tiles are then generated from the textured image and used to cover the target area in an aperiodic tiling pattern.

According to one aspect, the textured image may be obtained by scanning one or more texture images into memory.

According to another aspect, the textured image may be generated using a computer aided drawing package.

According to another aspect, to cover the target area, an aperiodic tiling pattern is selected. Textured tiles based on the aperiodic tiling pattern are then generated and applied to the target area.

According to another aspect, to apply the textured aperiodic tiles to the target area, the target area is covered with one or more aperiodic tiles that are based on a selected aperiodic tiling pattern. A corresponding textured tile is then mapped to each of the one or more aperiodic tiles.

According to still another aspect, to apply the textured aperiodic tiles to the target area, a composition atlas is determined. The composition atlas is used to recursively generate the complete set of tiles that cover the target area for the desired number of levels. The textured tiles are then mapped to the tiles associated with the complete set of generated tiles.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

The present invention is illustrated by way of example, and not by way of limitation, in the figures of the accompanying drawings and in which like reference numerals refer to similar elements and in which:

FIG. 2A illustrates periodic tilings having both a translational symmetry and a rotational symmetry;

FIG. 4 illustrates an example of an aperiodic tiling pattern that can be used in accordance with an embodiment of the invention;

FIG. 6 illustrates how the combining of smaller sized tiles of the same shape can be used to perform composition tiling;

DETAILED DESCRIPTION OF THE PREFERRED EMBODIMENT

A method and apparatus for applying tiles from a textured image to a target area is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
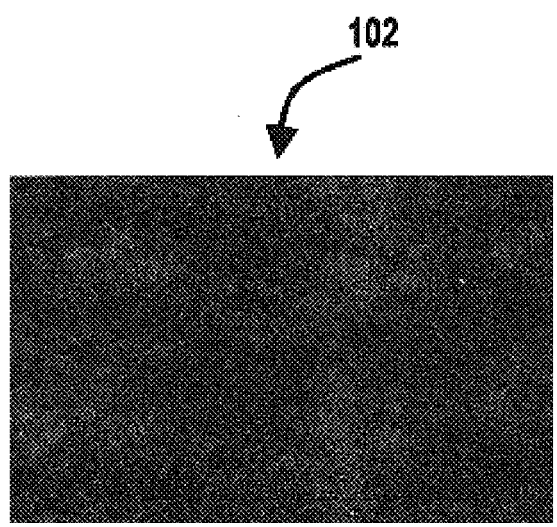
FIG. 1 illustrates a tile depicting a grass texture that can be used to cover a target area in accordance with an embodiment of the invention.
Figure 2B:
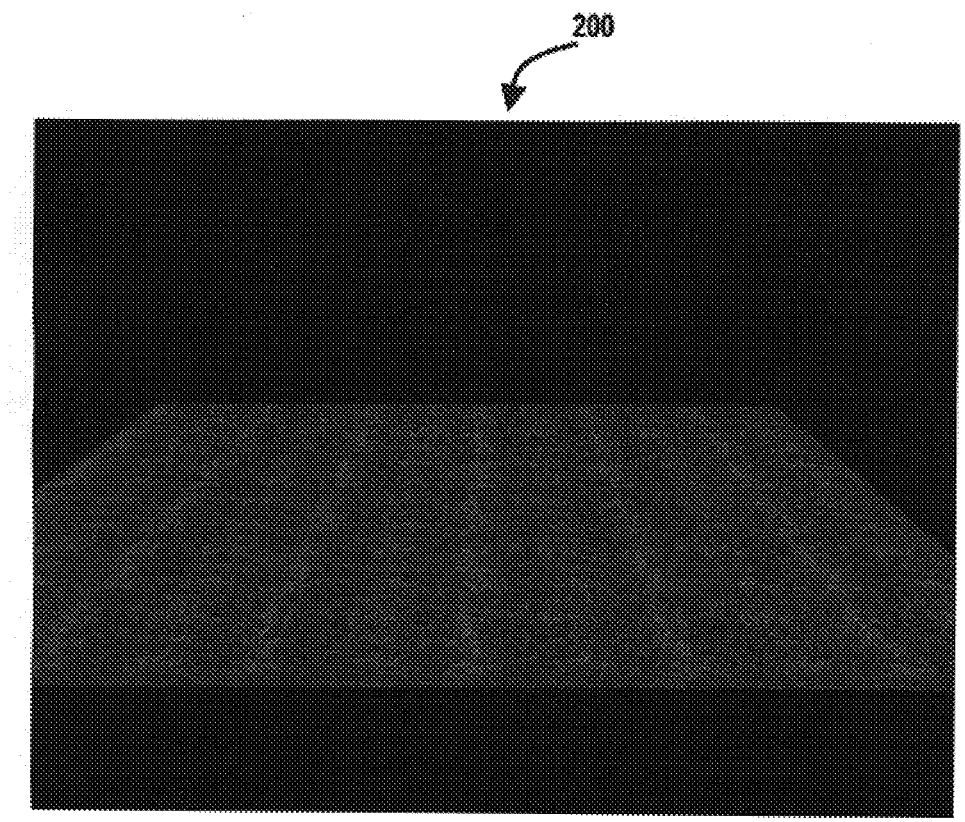
FIG. 2B illustrates a target area that is tiled with a textured tile in a periodic tiling pattern.
Figure 3:
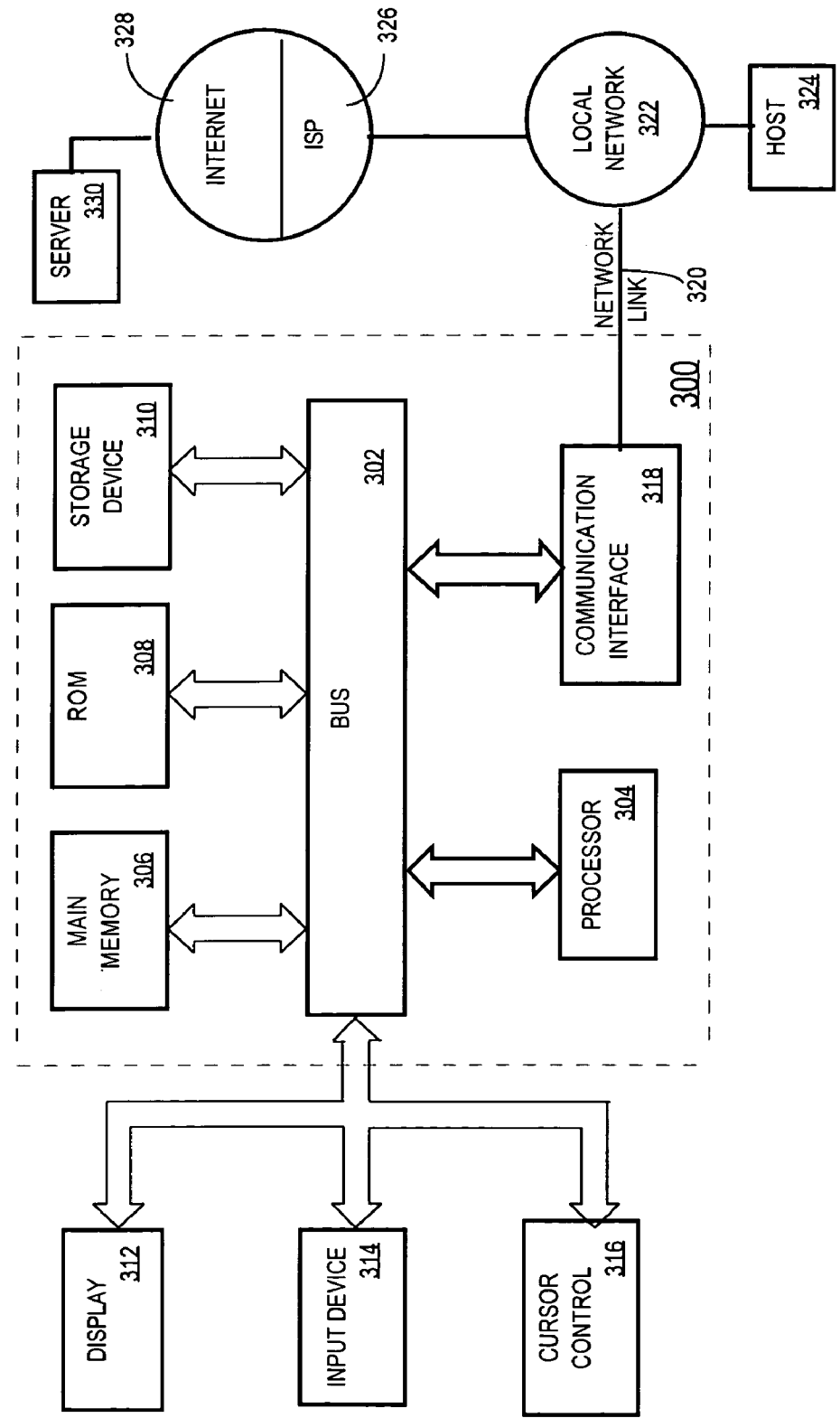
FIG. 3 is a block diagram illustrating a computer system on which an embodiment of the present invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for applying tiles from a textured image to a target area. According to one embodiment of the invention, the application of tiles from a textured image to a target area is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for applying tiles from a textured image to a target area as described herein.

The received code may be executed by processor 304 as it is received, and/or stored in storage device 310, or other non-volatile storage for later execution. In this manner, computer system 300 may obtain application code in the form of a carrier wave.

Overview

The present invention provides a mechanism for applying tiles from a textured image to a target area. In one embodiment, a set of aperiodic tiles are generated based on a texture image. In this context, aperiodic tiling is a set of proto-tiles that has infinitely many tilings of the plane but that no tiling is periodic. The set of aperiodic tiles is used to apply the texture image to a target area. Aperiodic tiling patterns have an inherent advantage in that they do not have any translational symmetry. Thus, because aperiodic tiling patterns have no translational symmetry, a target area can be covered with relatively small tiles cut from the same texture image without producing a linear repetition in the tiling pattern. In certain embodiments, a substitution tiling mechanism is used for mapping tiles to the target area. The substitution tiling mechanism takes advantage of the fact that some sets of aperiodic tiles can be constructed from a collection of smaller sized tiles of the same shape. Aperiodic tiling and the generation of aperiodic tiles using the substitution tiling mechanism is discussed in detail below.

Aperiodic Tiles

As previously indicated, aperiodic tiling can be used to cover a target area with a small repeated texture without forming a linear repetition of the tiling pattern. There are several known aperiodic tiling patterns, some of which are described in a book titled "Tiling and Patterns" written by Grünbaum and Shephard and published in 1987 by Freeman and Company.

FIG. 4 illustrates an example of an aperiodic tiling that can be used in accordance with an embodiment of the invention. FIG. 4 contains a target area 402, a textured image area 408 and an "aperiodic tile set" consisting of aperiodic tiles 404 and 406. An aperiodic tile set is a set of one or more tile shapes that exist in a given aperiodic tiling pattern. In this example, aperiodic tiles 404 and 406 have been mapped onto the textured image area 408 to generate textured tiles 404' and 406'. In certain embodiments, a user interface is provided that allows a user to chose the actual placement of the aperiodic tiles 404 and 406 on the textured image area 408 in order to generate textured tiles 404' and 406'. In addition, although aperiodic tiles 404 and 406 do not overlap on textured image area 408, in certain embodiments, aperiodic tiles 404 and 406 are placed in an overlapping configuration on the textured image area 408. This causes at least a portion of textured tiles 404' and 406' to be generated having a common area of the texture in textured image area 408.

As illustrated, the tiling of target area 402 is performed by applying textured tiles 404' and 406' in an aperiodic tiling pattern to target area 402. Because the tiling pattern of textured tiles 404' and 406' have no translational symmetry there is no regular repetition of the tiling pattern. Thus, because there is no regular repetition of the tiling pattern, applying the textured tiles 404' and 406' made from the texture image 408 to the target area 402 does not produce any discernable sub-patterns.

Figure 5:
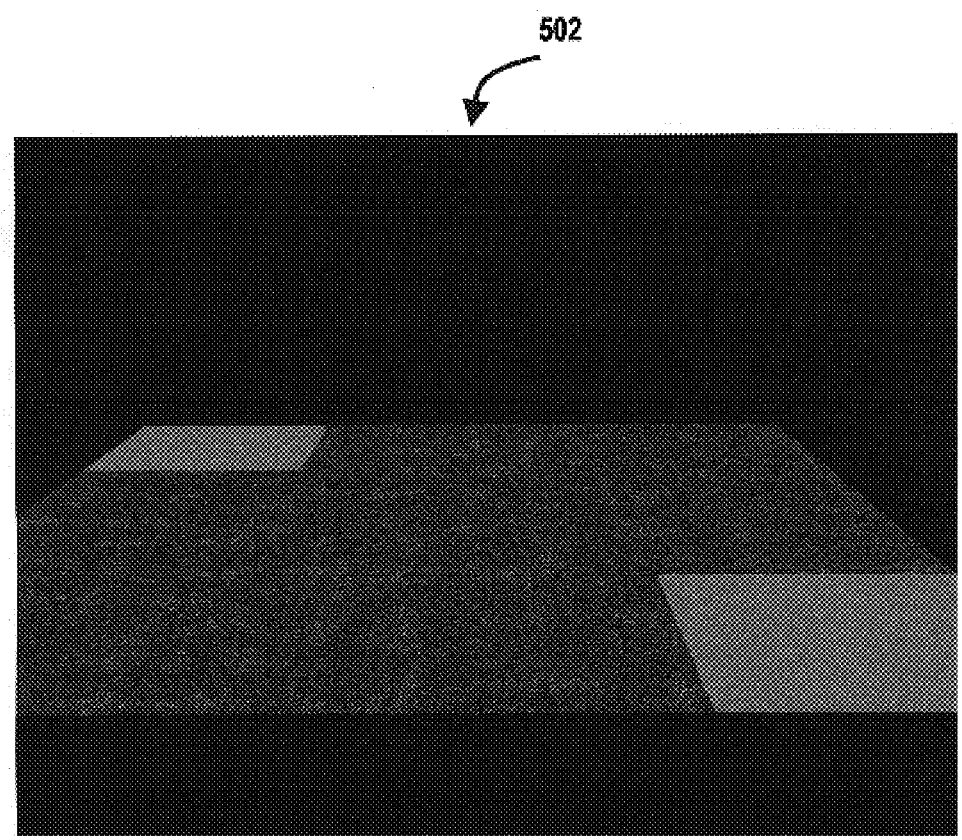
FIG. 5 illustrates how aperiodic tiling patterns can be used to eliminate linear repetition of a tiling pattern in a target area.

FIG. 5 illustrates how one aperiodic tiling can be used to eliminate linear repetition of the tiling pattern in a target area 502. In this example, textured tiles 404' and 406' have been made from the grass texture shown in tile 102 and applied to cover target area 502. As readily seen, the discernable rectangular sub-patterns that are visible in target area 200 have been eliminated through the use of aperiodic tiles 404 and 406.

Substitution Tiling

In certain embodiments, aperiodic tiles are constructed from a collection of smaller sized tiles of the same shape. This technique is generally known as substitution or composition tiling. FIG. 6 illustrates how the combining of smaller sized tiles of the same shape can be used to perform composition tiling. In this example, copies of tile 602 are combined to generate a composition atlas 604. A composition atlas is a description of the substitution rules that can be used to build each tile from the appropriate next set of smaller sized tiles. Thus, a composition atlas provides a description of how to get from one tiling level to the next.

Composition atlases are created by combining the tiles of a particular aperiodic tile set to generate a tile which has the same shape as a tile within the aperiodic tile set. Additionally, copies of composition atlas 604 may be recursively applied to each individual tile in the level one tiling 604 in order to generate tiling 606.

Figure 7:
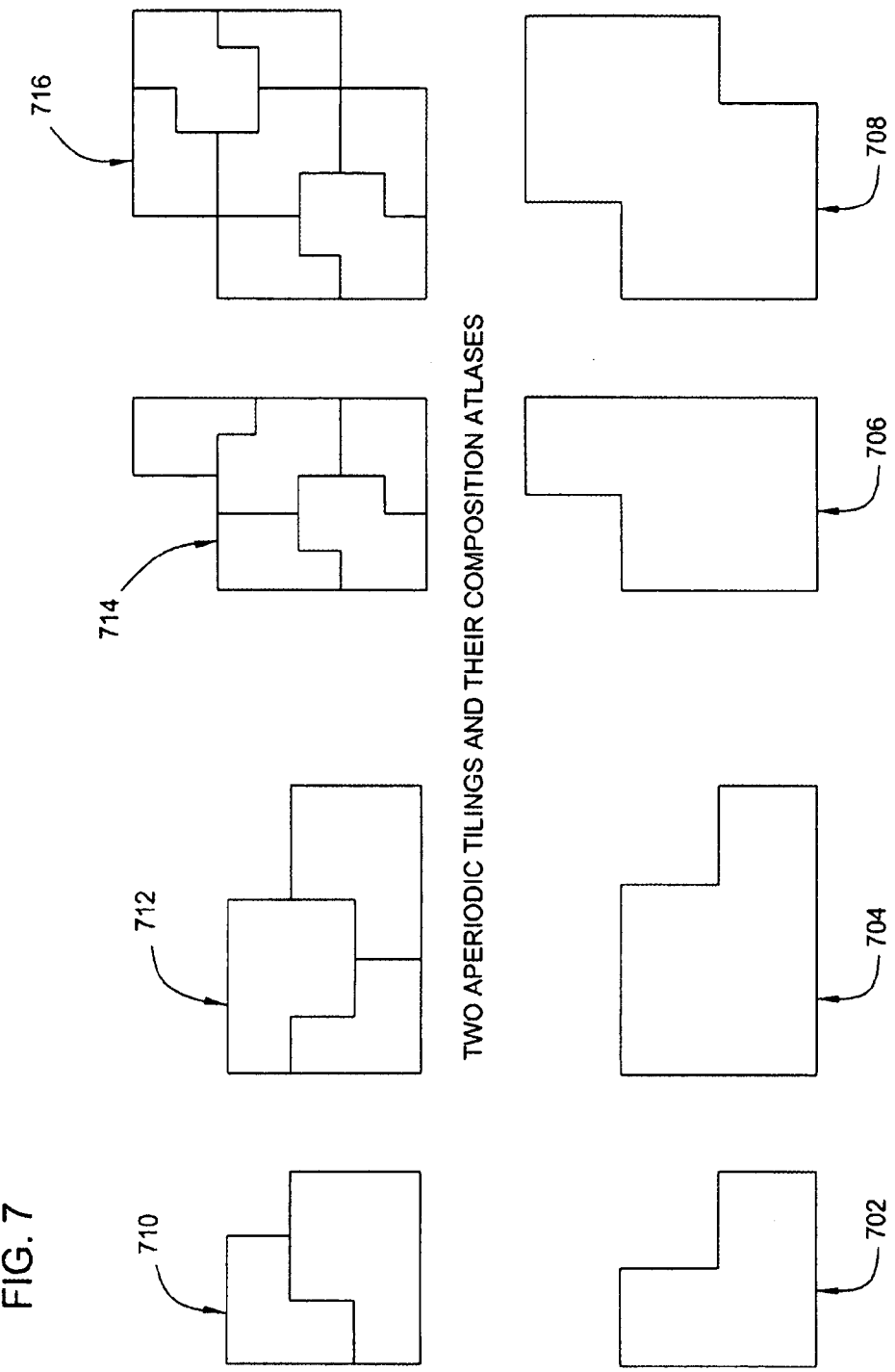
FIG. 7 illustrates an example of two aperiodic tiling patterns and their corresponding composition atlases.

FIG. 7 illustrates an example of two aperiodic tilings and their corresponding composition atlases. For each composition atlas, the size of the tiles change, but the actual shape remains the same. In one embodiment, to generate composition atlases, an aperiodic tile is inflated. The inflated tile is then repacked with tiles from the aperiodic tile set in which the inflated tile belongs by translating, rotating and mirroring tiles from the set of aperiodic tiles as required by the composition atlas. For example, composition atlases 710 and 712 are both composites of an aperiodic tile set that includes tiles 702 and 704, while composition atlases 714 and 716 are both composites of an aperiodic tile set that includes tiles 706 and 708. In this example, composition atlases 710, 712, 714 and 716 are all level-one tilings as each tile has been replaced using the appropriate composition atlas. However, by repeatedly substituting each tile within a composite atlas with its corresponding composition atlas, multi-level composition atlases can be formed. For example, by substituting each tile within composition atlas 716 with a corresponding composition atlas 714 or 716, a level-two composition atlas for tiles 706 and 708 can be formed. A benefit of performing composition tiling is that the intermediate tiles produce a complete hierarchical set that may be used to quickly determine which tile a particular pixel lies within. If a pixel lies within a single tile at one level of tiling, it must also lie within one of the composed tiles (of the single tile) at the next level of tiling. All other tiles at the next level may be ignored.

In general, to fit tiles 702 and 704 within composite atlases 710 and 712, tiles 702 and 704 are required to be placed in a particular position and orientation. Likewise, to fit tiles 706 and 708 within composite atlases 714 and 716, tiles 706 and 708 are required to be placed in a particular position and orientation. In this example, although composition atlases 710, 712, 714 and 716 have been drawn to the same size as their corresponding tiles 702, 704, 706 and 708, this has been for explanation purposes only.

Mapping the Textured Image to the Target Area

Textured images also known as texture maps, typically stored as a file, are composed of a plurality of texels that are arranged in a particular order. For example, textured image 102 is composed of a plurality of texels which are arranged in a rectangular array that has a certain height and width. Each texel is represented in a file by one or more bits. The one or more bits define the particular color of each texel. For example, textured image 102 may have a height of 300 texels and a width of 400 texels (i.e. 300×400) and may be represented using a particular number of bits which define the color of each texel.

In addition to the textured images, a target area, such as a computer monitor, consists of a plurality of pixels that are arranged in a particular order. For example, target area 502 is composed of a plurality of pixels which are arranged in a rectangular array that has a certain height and width. Each pixel is represented on the monitor by one or more bits. The one or more bits define the particular color of each pixel. For example, target area 502 may have a height of 600 pixels and a width of 800 pixels (i.e. 600×800) and may be represented using a particular number of bits for defining each pixel's color.

To apply a textured image to a target area, texels from the textured image are mapped into pixels within the target area on a pixel by pixel basis. In certain cases, each texel in the textured image may map directly to a pixel within the target area. In other cases, multiple texels may be map to a single pixel or instead, a single texel may be mapped to multiple pixels. The mapping of texels in a textured image to pixels in a target image is well known in the art of computer graphics as several books and articles have been published that discuss this area of computer graphics. For example, a book titled "Computer Graphics: Principles & Practice, 2nd Ed. in C" written by Foley, van Dam, Feiner & Hughes, and published in 1996 by Addison-Wesley, describes the process of mapping of texels in a textured image to pixels in a target image.

Performing Substitution Tiling

Figure 8:
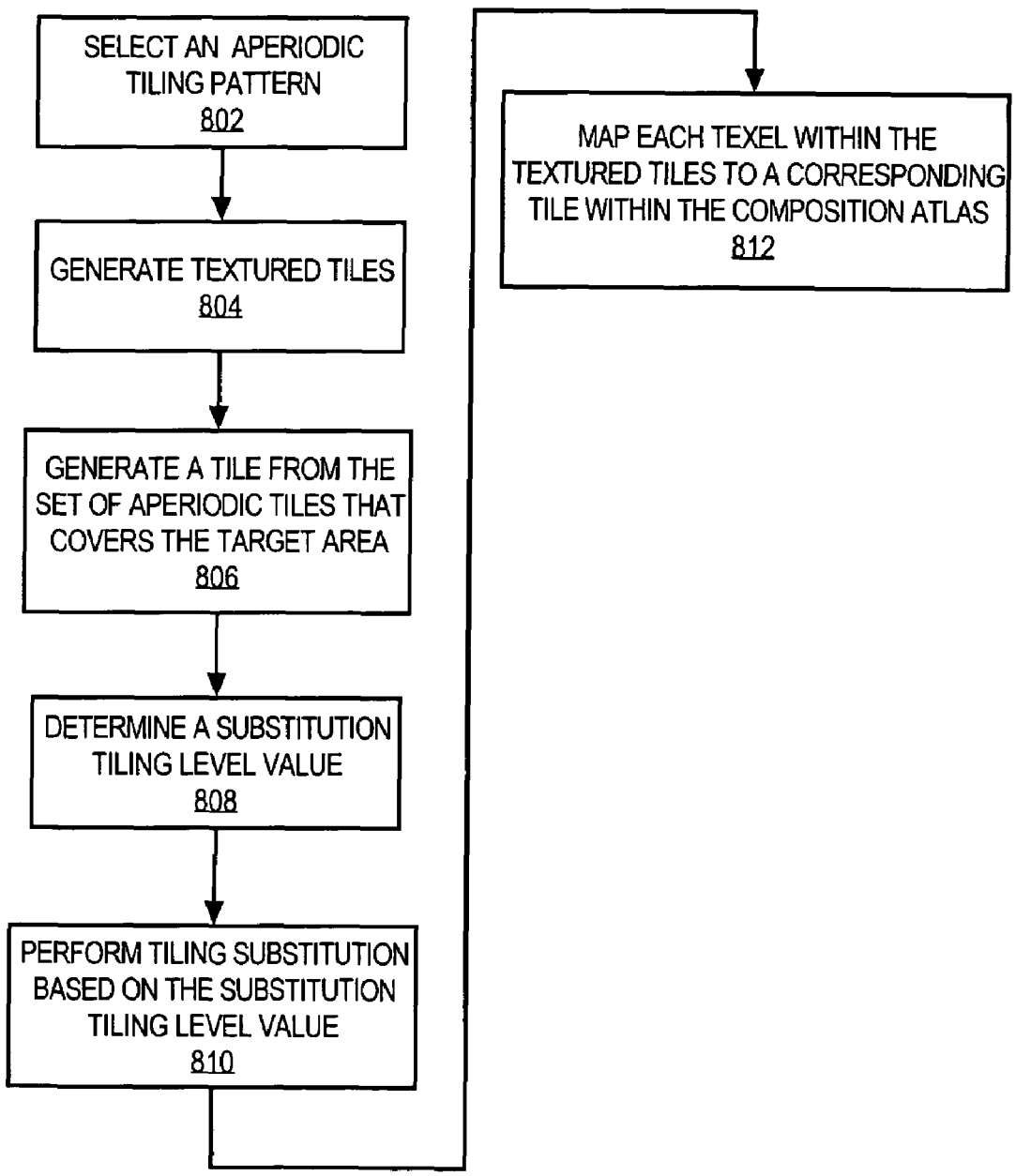
FIG. 8 is a flow diagram that illustrates a method for tiling a target region with tiles from texture image using a composition atlas.

FIG. 8 is a flow diagram that illustrates a method for tiling a texture image using a composition atlas.

At step 802, an aperiodic tiling pattern is selected for applying a texture image to a target area. Based on the aperiodic tiling, a set of aperiodic tiles are identified for use in tiling the target area. For explanation purposes, it shall be assumed that the set of aperiodic tiles includes tiles 404 and 406 as previously discussed in FIG. 4.

At step 804, a set of textured tiles is generated by mapping the set of aperiodic tiles onto the textured image. For example, as illustrated in FIG. 4, tiles 404 and 406 are mapped to textured image 408 to generate textured tiles 404' and 406'.

Figure 9A:
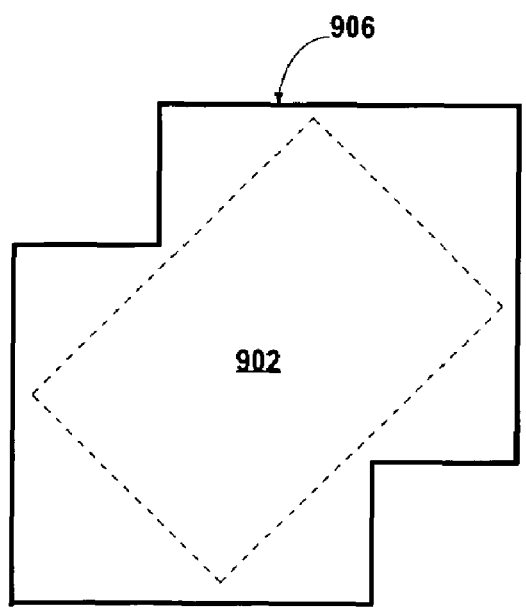
FIG. 9A illustrates how an aperiodic tile is generated such that it covers a target area.

At step 806, one or more tiles from the selected set of aperiodic tiles are identified and used to cover the target area. In certain embodiments, a single tile is identified from the selected set of aperiodic tile and used to cover the target area. In other embodiments, multiple tiles are identified from the selected set of aperiodic tile and used to cover the target area. To cover the target area, the one or more identified tiles maybe enlarged proportionally to cover the target area. For example, as shown in FIG. 9A, aperiodic tile 406 is enlarged to generate tile 906 and then used to cover the target area 902.

At step 808, a particular number of substitution tiling levels are selected for building a tiling.

Figure 9B:
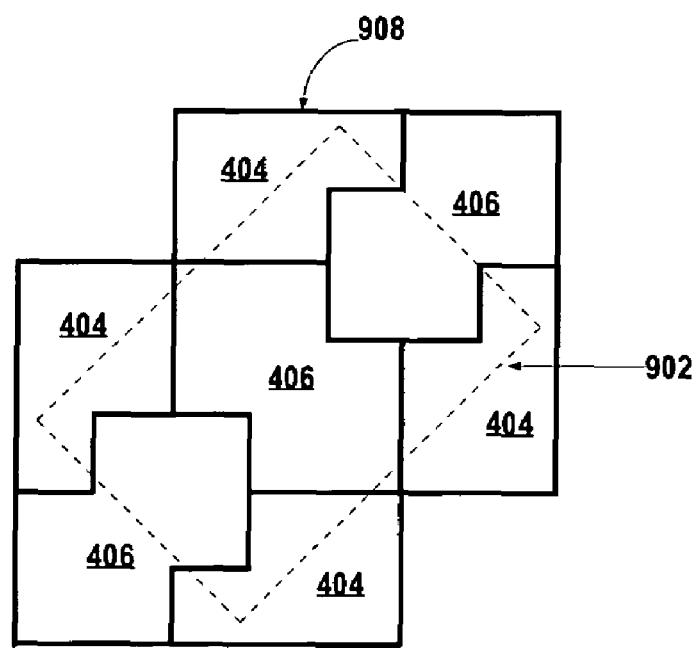
FIG. 9B illustrates a level-one composition atlas that may be built using a set of aperiodic tiles.

At step 810, based on the selected substitution tiling level a tiling is built for the target area. For example, FIG. 9B illustrates a level-one tiling 908 that is built using tiles 404 and 406 for tiling target area 902.

Figure 9C:
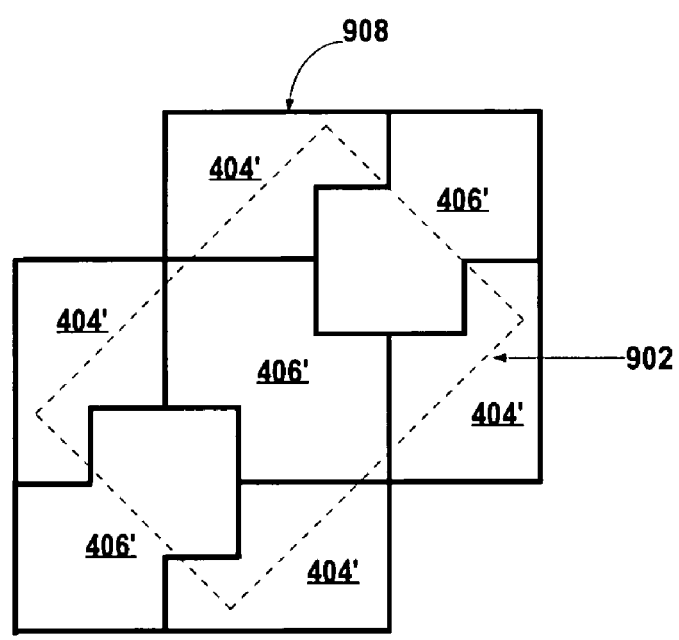
FIG. 9C illustrates the application of aperiodic tiles to a target area.

At step 812, the texels within each textured tile are mapped to a corresponding tile within the tiling that is covering the target area. For example, as illustrated in FIG. 9C the texels within textured tile 404' are mapped to the pixels in tiles 404 and the texels within textured tile 406' are mapped to the pixels in tiles 406 within tiling 908 for tiling target area 902.

In mapping texels to the textured area, one or more texels at the edges of two or more different tiles may map (i.e. overlap) to a single pixel within the target area. When this occurs, a decision must be made as to the particular color that will be applied to the single pixel. In certain embodiments, the color of the one or more texels at each of the two or more tiles are combined and then averaged to produce an "average" color. The average color is then applied to the single pixel. In an alternative embodiment, the one or more texels from the edge of one of the two or more tiles are selected and used in determining the color of the single pixel.

Once the texels are applied to the pixels within the tiling, the pixels that do not fall within the target area are discarded. Several methods are known in the art for discarding pixels that fall outside a particular boundary.

By using aperiodic tiles to apply a textured image to a target area, the applied texture will appear more uniform on the target region as the seams between aperiodic tiles are less noticeable to the eye. It should be noted that although the examples have depicted the use of certain aperiodic tiling patterns, the invention is not limited to any particular aperiodic tiling pattern.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for performing textured mapping of a target area that includes all or part of a graphics object and consists of a plurality of pixels, the method comprising the steps of:
    identifying an aperiodic tile set;
    selecting a placement of said aperiodic tile set on a textured image area, wherein the textured image area is a portion of a texture map;
    based on said placement, generating textured tiles by mapping said aperiodic tile set onto said textured image area; and
    covering said target area in an aperiodic tiling pattern with at least one textured tile selected from said textured tiles.

2. The method of claim 1, further comprising the step of: receiving input that defines said textured image area.

3. The method of claim 1, wherein said step of covering said target area in said aperiodic tiling pattern with said textured tiles includes the step of: placing said texture tiles in an overlapping configuration on said target area.

4. The method of claim 1, wherein said step of selecting said placement of said aperiodic tile set includes the step of: placing at least two aperiodic tiles from said aperiodic tile set in an overlapping configuration on said textured image area.

5. The method of claim 1, further comprising the step of: combining colors of a first texel from a first texture tile and a second texel from a second texture tile, wherein said first texel and said second texel map to a single pixel within said target area.

6. A computer-readable medium carrying one or more sequences of instructions for performing textured mapping of a target area that includes all or part of a graphics object and consists of a plurality of pixels, wherein execution of the one or more sequences of instructions by one or more processors causes the one or more processor to perform the steps of:
    identifying an aperiodic tile set;
    selecting a placement of said aperiodic tile set on a textured image area, wherein the textured image area is a portion of a texture map;
    based on said placement, generating texture tiles by mapping said aperiodic tile set onto said textured image area; and
    covering said target area in an aperiodic tiling pattern with at least one textured tile selected from said textured tiles.

7. The computer-readable medium of claim 6, wherein said execution causes said one or more processor to perform the step of: receiving input that defines said textured image area.

8. The computer-readable medium of claim 6, wherein said step of covering said target area in said aperiodic tiling pattern includes the step of: placing said texture tiles in an overlapping configuration on said target area.

9. The computer-readable medium of claim 6, wherein said step of selecting said placement of said aperiodic tile set includes the step of: placing at least two aperiodic tiles from said aperiodic tile set in an overlapping configuration on said textured image area.

10. The computer-readable medium of claim 6, further comprising the step of: combining colors of a first texel from a first texture tile and a second texel from a second texture tile, wherein said first texel and said second texel map to a single pixel within said target area.

* * * * *